(12) United States Patent
Hu et al.

(10) Patent No.: US 9,596,725 B2
(45) Date of Patent: Mar. 14, 2017

(54) METHOD AND CIRCUIT FOR CONSTANT CURRENT BUCK CONVERTER

(71) Applicant: SHANGHAI SIM-BCD SEMICONDUCTOR MANUFACTURING CO., LTD., Shanghai (CN)

(72) Inventors: Zhimin Hu, Shanghai (CN); Qun Li, Shanghai (CN); Lei Cheng, Shanghai (CN); Junelei Li, Shanghai (CN)

(73) Assignee: Shanghai SIM-BCD Semiconductor Manufacturing Co., Ltd., Shanghai (CN)

(*) Notice: Subject to any disclaimer, the term of this patent is extended or adjusted under 35 U.S.C. 154(b) by 0 days.

(21) Appl. No.: 14/670,319

(22) Filed: Mar. 26, 2015

(65) Prior Publication Data

US 2015/0280592 A1   Oct. 1, 2015

(30) Foreign Application Priority Data

Mar. 28, 2014  (CN) .......................... 2014 1 0122765

(51) Int. Cl.
*H05B 33/08* (2006.01)
*H02M 3/156* (2006.01)
*H02M 1/00* (2006.01)
*H02M 1/42* (2007.01)

(52) U.S. Cl.
CPC ........ *H05B 33/0815* (2013.01); *H02M 3/156* (2013.01); *H02M 2001/0009* (2013.01); *H02M 2001/0064* (2013.01); *H02M 2001/4291* (2013.01); *Y02B 20/346* (2013.01); *Y02B 70/126* (2013.01)

(58) Field of Classification Search
CPC ...... H02M 1/4208; H02M 3/00; H02M 3/156; H02M 3/33507; H02M 3/135; H02M 3/137; G05F 1/30; G05F 1/33
USPC ............... 363/78, 80, 84, 89, 123, 124, 125; 323/272, 282, 285
See application file for complete search history.

(56) References Cited

U.S. PATENT DOCUMENTS

| | | | |
|---|---|---|---|
| 2011/0317459 A1* | 12/2011 | Kuebrich | H02M 1/4225 363/126 |
| 2013/0077354 A1* | 3/2013 | Behagel | H02M 3/33523 363/21.01 |
| 2014/0159693 A1* | 6/2014 | Kuang | H02M 1/42 323/285 |
| 2014/0185339 A1* | 7/2014 | Jang | H02M 1/4225 363/44 |

(Continued)

*Primary Examiner* — Adolf Berhane
(74) *Attorney, Agent, or Firm* — Kilpatrick Townsend & Stockton LLP

(57) ABSTRACT

A switch mode power supply (SMPS) includes a buck converter circuit that includes a first inductor coupled to an output terminal and a switch device coupled the first inductor. A controller is configured for regulating the output current based at least in part on controlling a peak current in the first inductor according to a ratio between an instantaneous voltage to an average voltage at the negative output terminal. The controller is configured to cause the SMPS to operate in a boundary conduction mode (BCM). The controller is configured to maintain a constant average output current that is substantially independent of the input voltage and the output voltage, and also provide a high power factor.

22 Claims, 10 Drawing Sheets

(56) References Cited

U.S. PATENT DOCUMENTS

| | | | |
|---|---|---|---|
| 2015/0035446 A1* | 2/2015 | Yamahara | H05B 33/0818 |
| | | | 315/210 |
| 2015/0035453 A1* | 2/2015 | Seki | H05B 33/08 |
| | | | 315/294 |
| 2015/0048807 A1* | 2/2015 | Fan | H02M 1/42 |
| | | | 323/208 |
| 2016/0066375 A1* | 3/2016 | Seki | H05B 33/0815 |
| | | | 315/224 |
| 2016/0066388 A1* | 3/2016 | Seki | H05B 33/0815 |
| | | | 315/200 R |
| 2016/0087523 A1* | 3/2016 | Liu | H02M 1/4208 |
| | | | 363/21.12 |

* cited by examiner

METHOD AND CIRCUIT FOR CONSTANT CURRENT BUCK CONVERTER

CROSS-REFERENCES TO RELATED APPLICATIONS

This application claims priority to Chinese Patent Application No. 201410122765.2, filed Mar. 28, 2014, commonly owned and incorporated by reference herein.

BACKGROUND OF THE INVENTION

The present invention relates generally to the field of switch mode power supply (SMPS). More particularly, embodiments of the present invention relate to SMPS with a buck converter circuit for providing a constant output current.

Switch mode power supply (SMPS) systems have many advantages over convention linear regulated power supplies. These advantages include smaller volume, better stability, and higher power efficiency. As a result, SMPS has found wide spread applications, such as televisions, set-top boxes, video recorders, portable telephone chargers, and personal digital assistants (PDAs), etc. In recently years, as light emitting diode (LED) technologies are becoming more mature, SMPS is widely used as drivers for LED devices, including back lighting for display devices and white-light bulb replacement applications.

Switched mode power supply systems can be isolated or non-isolated. In isolated power supplies, a transformer is used to transfer energy between the primary side and the secondary side. In a non-isolated switched mode power supply system, a power switch is connected to an inductor, which is also connected to the output. Magnetic energy is stored in the inductor when the switch is turned on, and the energy is transferred to the output when the switch is turned off. A buck converter, also known as a step-down converter, is an example of non-isolated switched mode power supply system that has been used in driving LED lighting systems because of its simple circuit topology and low cost.

BRIEF SUMMARY OF THE INVENTION

The inventors have observed that conventional switched mode power supplies for driving LED lighting systems suffer from many limitations. For example, when an SMPS is used to drive an LED, it generally needs to provide a constant output current in order to maintain stable brightness of the LED. When used with different AC power sources, for example, 110V vs. 220V, conventional LED lighting devices often need to be customized for the local power sources. A different control circuit is often required, or an additional power source selection circuit is needed. Moreover, unlike convention incandescent light bulbs, LEDs lighting devices do not behave like a purely resistive load in an AC circuit. Therefore, conventional LED light bulbs often do not provide desirable efficiency in the utilization of the AC power as measured by "power factor". A recent U.S. energy efficiency standard requires an LED with greater than 5 W power rating to have a power factor no lower than 0.7. A European standard requires an LED with more than 25 W to have a power factor higher than 0.94. Conventional devices often cannot meet these standards. Further, a buck converter is a non-isolated power supply, and the output current tends to be affected by the variations in the input voltage or output load voltage.

In embodiments of the present invention, an SMPS has a buck converter topology in which a positive output terminal is coupled to the input voltage, and the output current and voltage are provided between the positive output terminal and a negative output terminal. A controller starts the inductor charging cycle when the inductor current discharges to zero such that the buck converter operates in the boundary conduction mode (BCM). The controller is configured to monitor the peak current in the inductor using a reference signal that is based on a ratio between the instantaneous voltage at the negative output terminal and the average voltage at the negative output terminal. In embodiments of the invention, the output current can be shown to be independent of the input voltage and the output load voltage. In some embodiments, the output current can be shown to depend only on the resistances of certain resistors. Moreover, the input current of the power supply is in phase with the input voltage, thus providing a high power factor.

In alternative embodiments, the converter receives from the negative output terminal a compensation signal, which includes information regarding both the input voltage and output voltage. Therefore, a single compensation signal can provide the controller with information to compensate for variations in both the input voltage and the output load voltage.

In some embodiments, the power supply can combine the compensation method with the reference signal sampling method in BCM operation to achieve constant current output with high power factor and can be insensitive to variations in both the input voltage and the output load voltage.

According to some embodiments of the invention, a switch mode power supply (SMPS) includes an input terminal and a ground terminal for receiving a rectified DC input voltage. The SMPS also has a positive output terminal and a negative output terminal for providing an output current to an output load. In some embodiments, the output load can be an LED (light-emitting diode) load. The output current is configured to flow from the positive output terminal through the output load to the negative output terminal. The positive output terminal is coupled to the input terminal. The SMPS has a buck converter circuit that includes a first inductor having one end coupled to the negative output terminal, and a switch device coupled to the other end of the first inductor at a first node. The switch device is coupled to a current sense resistor which is coupled to the ground terminal. A diode is coupled between the input terminal and the first node. An output capacitor is coupled between the positive output terminal and the negative output terminal. The SMPS also has a controller configured for regulating the output current based at least in part on controlling a peak current in the first inductor. In some embodiments, the buck converter circuit can include a transformer, and the first inductor is a primary winding of the transformer. The transformer further includes a secondary winding which provides a feedback signal to a feedback input terminal of the controller for monitoring discharging of the first inductor and turning on the switch device.

In some embodiments of the SMPS, the controller is configured for regulating the output current based at least in part on controlling a peak current in the first inductor using a signal derived from the current sense resistor. The controller is also configured to receive an output compensation signal from the negative output terminal of the SMPS. In these embodiments, the controller is configured such that variations in the input voltage and output voltage are compensated to maintain a constant output current.

In some embodiments of the SMPS, the controller is configured for regulating the output current based at least in part on controlling a peak current in the first inductor according to a ratio between an instantaneous voltage at the negative output terminal to an average voltage at the negative output terminal. The controller is configured to cause the SMPS to operate in a boundary conduction mode (BCM). In these embodiments, in the boundary conduction mode (BCM), when the current in the first inductor is discharged to zero, the switch device is turned on to allow current to flow in the first inductor. The controller is configured to maintain a constant average output current that is independent of the input voltage and the output voltage. In some embodiments, the controller is configured such that the input current of the SMPS is a time-varying signal that is in phase with the input voltage, thereby providing a high power factor.

In some embodiments of the SMPS, the controller is configured for regulating the output current based at least in part on controlling a peak current in the first inductor according to a ratio between an instantaneous voltage at the negative output terminal to an average voltage at the negative output terminal. The controller is also configured to receive an output compensation signal from the negative output terminal of the SMPS. Further, the controller is configured to cause the SMPS to operate in a boundary conduction mode (BCM). In these embodiments, the controller is configured to maintain a constant average output current that is independent of the input voltage and the output voltage. The input current of the SMPS is a time-varying signal that is in phase with the input voltage, thereby providing a high power factor. In addition, variations in the input voltage and output voltage are compensated.

A further understanding of the nature and advantages of the present invention may be realized by reference to the remaining portions of the specification and the drawings.

DETAILED DESCRIPTION OF THE INVENTION

Figure 1:
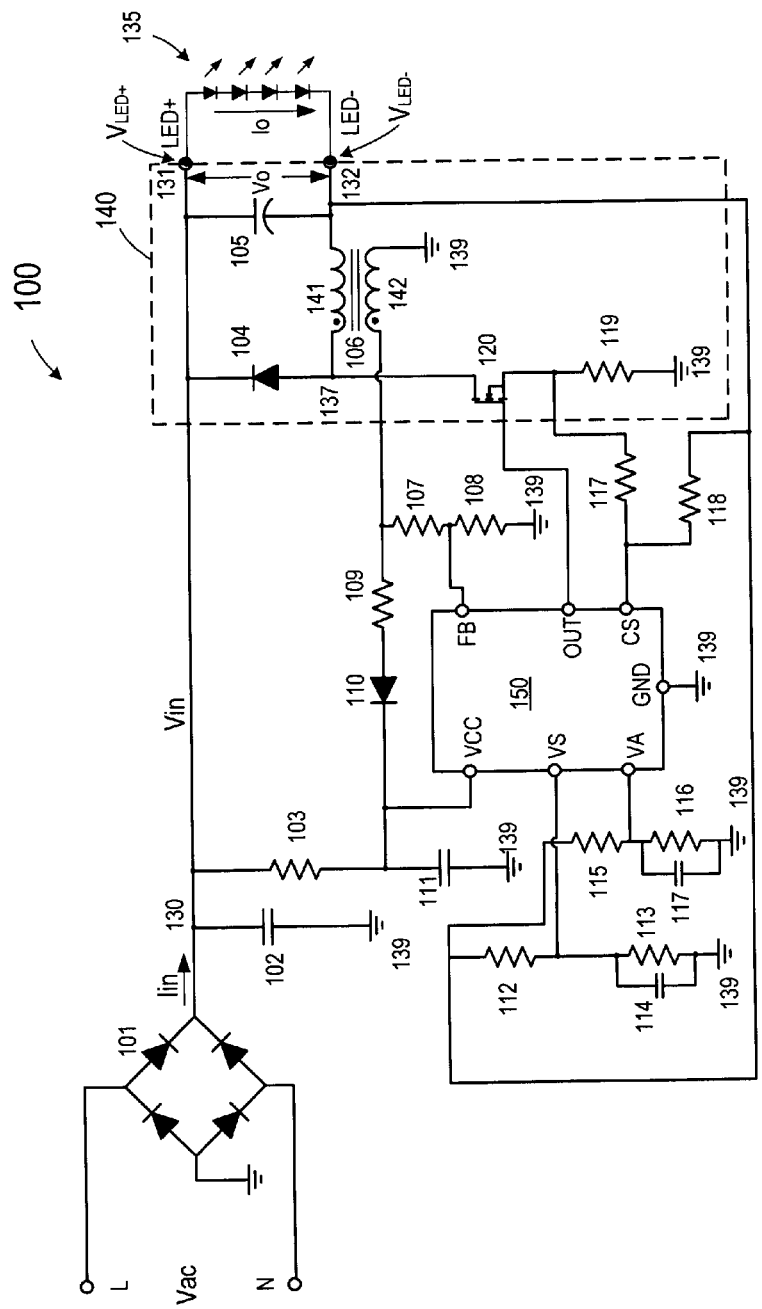
FIG. 1 is a simplified diagram illustrating a switch mode power supply (SMPS) driving a string of light emitting diodes (LED) according to an embodiment of the present invention.

FIG. 1 is a simplified diagram illustrating a switch mode power supply (SMPS) 100 driving a string of light emitting diodes (LED) 135 according to an embodiment of the present invention. As shown in FIG. 1, SMPS 100 includes an input terminal 130 and a ground terminal 139 for receiving a rectified DC input voltage Vin from a rectifying circuit 101 that includes a diode bridge and rectifies an AC input voltage supply Vac between terminals L and N. SMPS 100 also has a positive output terminal 131 (also labeled as LED+) and a negative output terminal 132 (also labeled as LED−) for providing an output current Io to an LED (light-emitting diode) load 135. As shown in FIG. 1, output current Io is configured to flow from positive output terminal 131 through the LED load 135, to negative output terminal 132. Further, the positive output terminal 131 is connected to the input terminal 130 and to rectified input voltage Vin. In this example, SMPS 100 also includes in a buck converter circuit 140.

As shown in FIG. 1, buck converter circuit 140 includes a first inductor 141 coupled between the negative output terminal 132 and a first node 137. Inductor 141 is coupled at the first node 137 to a diode 104, which is coupled to the input terminal 130 and the positive output terminal 131. In the example of FIG. 1, inductor 141 is a primary winding of a transformer 106, which also has a secondary winding, which is used as an auxiliary winding, 142. However, a single inductor 141 and a separate auxiliary winding 142 can also be used. Buck converter circuit 140 also includes a switch device 120 coupled to the first inductor 141 and the diode 104 at the first node 137. In this example, switch device 120 is shown as an MOS power transistor. Alternatively, another type of switch device such as a bipolar transistor can also be used. Switch device 120 is further coupled to the ground terminal 139 through a sense resistor 119. Buck converter circuit 140 also has an output capacitor 105 coupled between positive output terminal 131 and negative output terminal 132.

Figure 2:
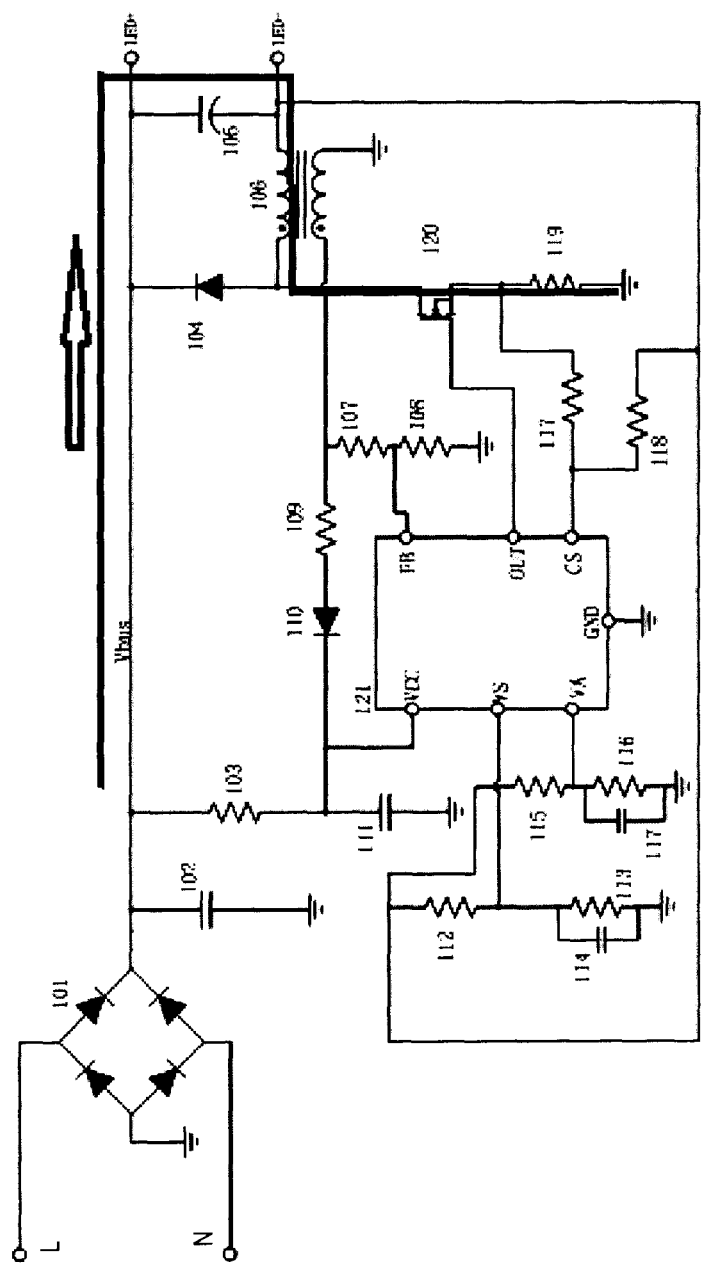
FIG. 2 shows the SMPS of FIG. 1 and highlights the path of the input current charging the inductor when the switch is turned on, according to an embodiment of the present invention.
Figure 3:
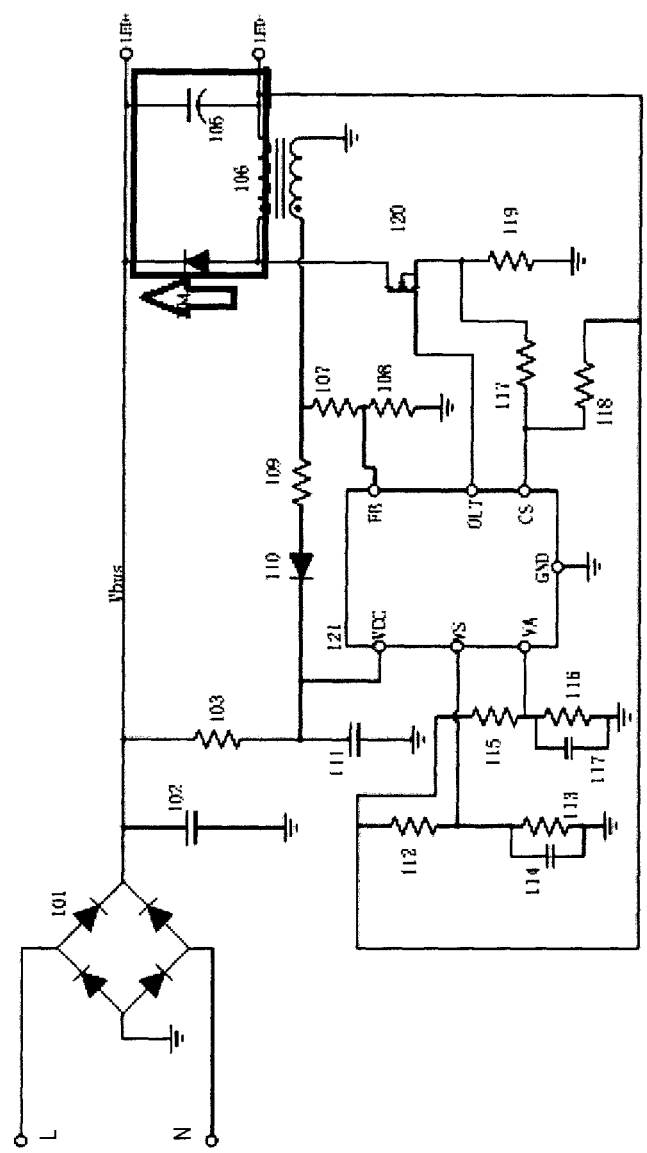
FIG. 3 shows the SMPS of FIG. 1 and highlights the path of the inductor current discharging to the output capacitor when the switch is turned off, according to an embodiment of the present invention.

As shown in FIG. 1, SMPS 100 also includes a controller 150 configured for regulating the output current Io. Controller 150 includes an input terminal CS for receiving a current sense signal $V_{CS}$ associated with a current flowing through inductor 141 and switch device 120. In FIG. 1, the CS terminal is coupled to switch device 120 and a current sense resistor 119 through a resistor 117. Controller 150 also has an FB terminal for receiving a feedback signal $V_{FB}$, which reflects the current in the inductor. In the example of FIG. 1, the FB signal is taken from auxiliary winding 142 through a voltage divider formed by resistors 107 and 108. In this embodiment, auxiliary winding 142 also provides operating power to controller 150 through a VCC terminal. Controller 150 also has an output terminal OUT for providing a control signal to turn on and off switch device 120 to regulate the output current Io of the SMPS. When the switch device is turned on, the input voltage Vin causes electrical current to flow through inductor 141 and stores magnetic energy in the inductor. When the switch device is turned off, the stored magnetic energy in the inductor charges the output capacitor 105. FIG. 2 highlights the path of the input current charging the inductor when the switch is turned on. FIG. 3 highlights the path of the inductor current discharging to the output capacitor when the switch is turned off.

In some embodiments, controller 150 is configured to turn on switch device 120 to allow current to flow through the inductor when the feedback signal $V_{FB}$ falls below a reference signal to indicate that the inductor current has fallen, and more energy is needed in the buck converter circuit. In other words, when $V_{FB}$ falls to a preset reference value, controller 150 issues the OUT signal to turn on the switch device. Controller 150 is also configured to turn off the switch to stop charging the inductor, when the current sense signal $V_{CS}$ reaches a peak current reference voltage. Depending on the peak current reference value, the SMPS can operate in one of three modes. In the continuous conduction mode (CCM), the inductor current never falls to zero in an operating cycle. In the discontinuous mode (DCM), the inductor current is zero for a period of time in an operating cycle. The boundary conduction mode (BCM) is a condition between CCM and DCM, in which when the inductor current falls to zero, the switch is turned on to cause inductor current to flow again. In embodiments of the invention, the current in the inductor continues to rise until it reaches a preset peak current $I_{pk}$, which condition is indicated when current sense signal $V_{CS}$ reaches a reference value $V_{CS(ref)}$. As shown in FIG. 1, the voltage at positive output terminal 131 (LED+) is the same as the rectified input voltage Vin, and the voltage at negative output terminal 132 (LED−) varies according to the voltage on the output capacitor 105 and Vo, which is the output voltage of the SMPS. Thus, controller 150 is configured to turn on and off switch device 120 as needed to regulate the output Vo and Io of the SMPS.

It is noted that, in embodiments of the invention, the SMPS is configured to maintain constant average output voltage Vo and output current Io, but the instantaneous values of Vo and Io are allowed to have time-varying characteristics. In driving an LED lighting system, such as those used in illumination or backlight applications, it is desirable for the power supply to provide a constant current to the LED to maintain a stable brightness. However, due to the effect of persistence of vision, human eyes are usually unable to detect brightness changes in a time period shorter than one millisecond. In some embodiments of the present invention, constant brightness can be maintained by a power supply configured to provide a substantially constant average output current at a time scale of, for example, 10 milliseconds or longer. In some embodiments, the output current does not have harmonic components with a frequency higher than 100 Hz. In LED driver applications using such power supplies, the brightness of the LED devices can appear to be constant, without brightness variations detectable to the human eye. In a time scale of less than 10 milliseconds, the average output current can vary with time.

To facilitate obtaining a high power factor, it is desirable for Vin to retain certain time varying characteristics of Vac. Therefore, a relatively low capacitance is selected for capacitor 102. For example, the capacitance of capacitor 102 can be between 10 nF to 100 nF. In contrast, in some conventional power supplies, the rectifying capacitor can have a capacitance on the order of 5 uF. Alternatively, capacitor 102 can be larger than 100 nF or smaller than 10 nF. In embodiments of the invention, the instantaneous value of the rectified input voltage Vin can be expressed as $\sqrt{2} \cdot \text{Vin} \cdot \sin \theta$, where the phase angle $\theta$ is within half the period $(0, \pi)$ of the AC input voltage. As shown in FIG. 1, the instantaneous value of the voltage at negative output terminal 132 (LED−), $V_{LED-}$, can be expressed as $$\sqrt{2} \cdot V\text{in} \cdot \sin \theta - V o.$$

Figure 4:
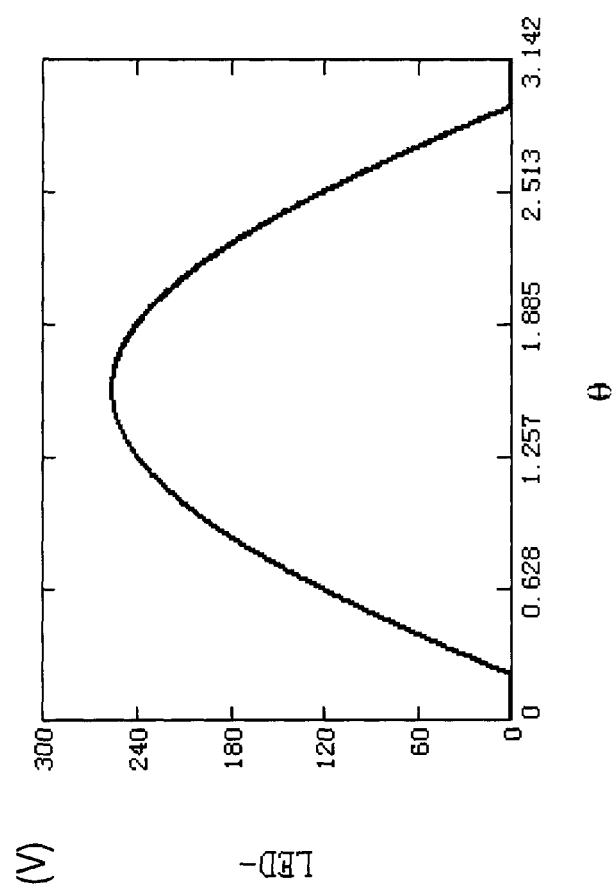
FIG. 4 illustrates a waveform of the voltage at the negative output terminal in the SMPS of FIG. 1 as a function of input voltage phase angle θ within half a period (0, π) according to an embodiment of the present invention.

FIG. 4 illustrates a waveform of $V_{LED-}$ as a function of input voltage phase angle $\theta$ within half the period $(0, \pi)$.

In some embodiments, controller 150 also has an input terminal VS for receiving a sampled output signal $V_{VS}$ derived from the negative output terminal 132 (LED−) of the SMPS. As shown in FIG. 1, terminal VS is coupled to negative output terminal 132 through a voltage divider formed by a resistor 112 and a parallel combination of a resistor 113 and a capacitor 114. Capacitor 114 is used mainly to filter out the noise in the circuit and, therefore, and has a relatively low capacitance which can be, for example, between tens pF to several nF. Alternatively, capacitor 114 can have a capacitance in the range from 1.0 pF to 10 nF. Here, $V_{VS}$ represents a sampled instantaneous value detected at the negative output terminal 132, and can be expressed as follows.

$$V_{VS} = K_{VS} \cdot (\sqrt{2} \cdot V\text{in} \cdot \sin \theta - Vo)$$

where $K_{VS}$ is a proportionality constant determined by the resistances of resistors 112 and 113 in the voltage divider associated with terminal VS.

Controller 150 also has an input terminal VA for receiving an average output signal $V_{VA}$ derived from the negative output terminal of the SMPS. As shown in FIG. 1, terminal VA is coupled to negative output terminal 132 through a voltage divider formed by a resistor 115 and a parallel combination of a resistor 116 and a capacitor 117. Here, the capacitance of capacitor 117 is selected to be large enough relative to the frequency of the input AC voltage such that $V_{VA}$ represents a sampled average value detected at the negative output terminal 132. For example, in some embodiments, the capacitance of capacitor 117 can be between hundreds of nF to a few µF. Alternatively, capacitor 117 can have a capacitance in the range from 100 nF to 10 µF. Mathematically, $V_{VA}$ and can be expressed as follows.

$$V_{VA} = \frac{1}{\pi} \cdot \int_{\arcsin\left(\frac{Vo}{\sqrt{2} \cdot V\text{in}}\right)}^{\pi - \arcsin\left(\frac{Vo}{\sqrt{2} \cdot V\text{in}}\right)} K_{VA} \cdot (\sqrt{2} \cdot V\text{in} \cdot \sin \theta - Vo) d\theta$$

where $K_{VS}$ is a proportionality constant determined by the resistances of resistors 115 and 116 in the sampling voltage divider associated with terminal VA.

As described above, controller 150 is configured to control the peak current flowing in the inductor by controlling the current sense voltage signal $V_{CS}$ derived from the current sense resistor 119, $R_{CS}$, with respect to a reference value $V_{CS(ref)}$. Thus, the peak current through the inductor can be expressed as follows.

$$I_{pk} = \frac{V_{CS(ref)}}{R_{CS}}$$

In some embodiments, $V_{CS(ref)}$ is selected to simply the control and is defined as follows.

$$V_{CS(ref)} = \frac{V_{VS}}{V_{VA}} \cdot V_{CS\_REF}$$

where $V_{CS\_REF}$ is a preset constant reference voltage.

Figure 5:
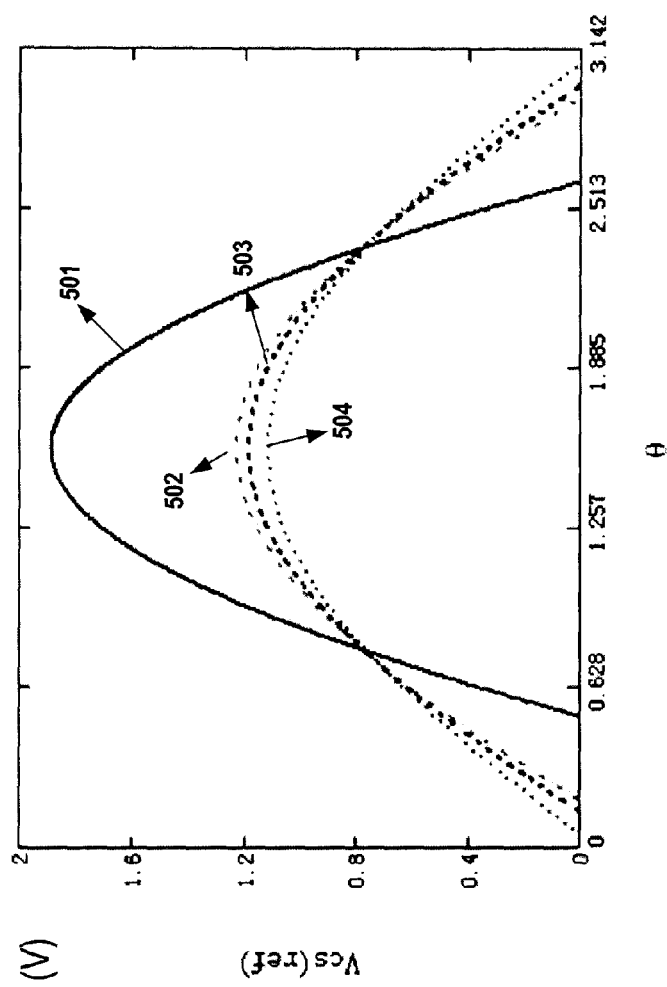
FIG. 5 illustrates examples of reference voltage $V_{CS(ref)}$ as a function of input voltage phase angle θ within a the period (0, π) under different input voltages and output load conditions.

It can be seen that inductor current sense reference voltage $V_{CS(ref)}$ varies with the instantaneous value of sampled voltage $V_{VS}$ divided by the average value of sampled voltage $V_{VA}$. Therefore, $V_{CS(ref)}$ can be regarded as a normalized sample of the voltage at the negative output terminal, and it is configured to vary with the phase angle of the input line voltage. FIG. 5 illustrates examples of reference voltage $V_{CS(ref)}$ as a function of input voltage phase angle θ is within half the period (0, π) under different input voltages and output load conditions. Specifically, curve 501 shows the reference voltage with an input voltage of 100V and an output load of 70V. Curve 502 shows the reference voltage with an input voltage of 265V and an output load of 70V. Curve 503 shows the reference voltage with an input voltage of 100V and an output load of 20V. Curve 504 shows the reference voltage with an input voltage of 265V and an output load of 20V.

Figure 6:
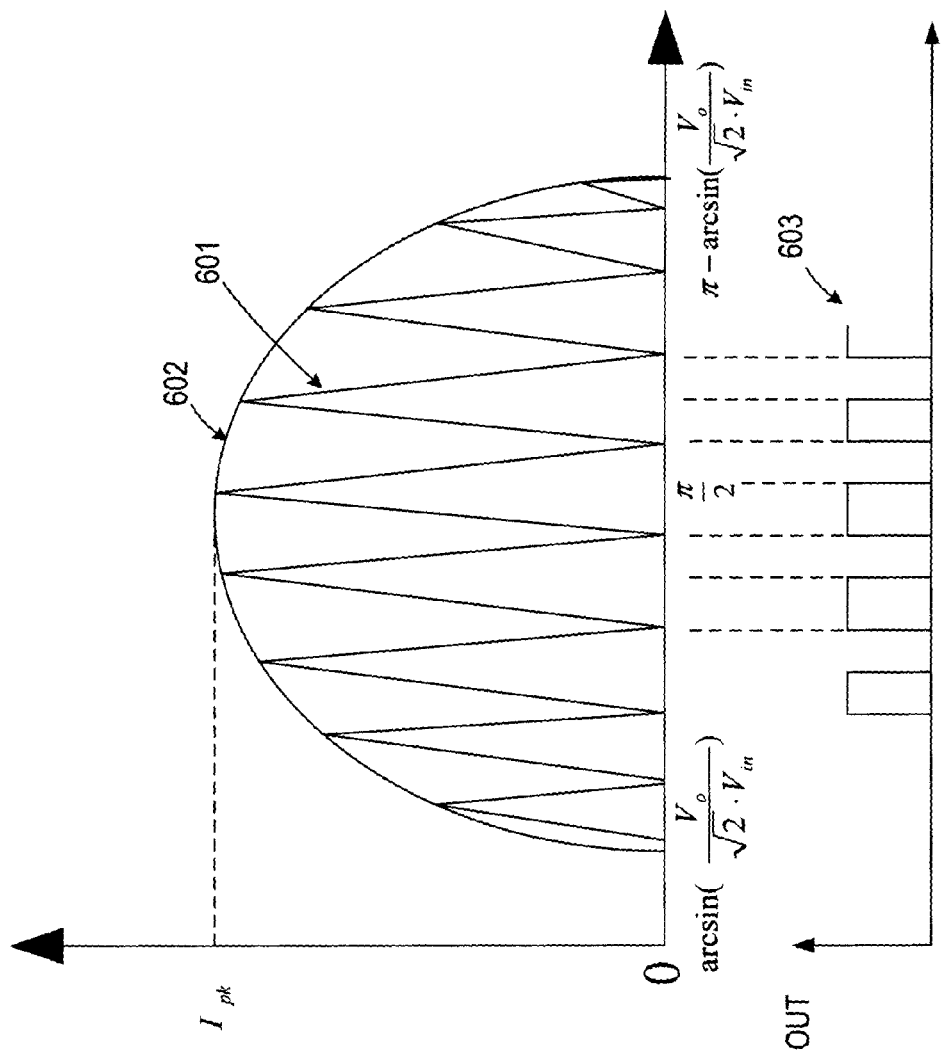
FIG. 6 illustrates the instantaneous current flowing through the inductor, an envelope of the peak inductor current, and the output signal from the controller to the switch according to an embodiment of the present invention.

As described above, in some embodiments, the SMPS is configured to operate in a boundary conduction mode (BCM). FIG. 6 illustrates the current 601 flowing through the inductor, an envelope of the peak inductor current 602, and the output signal OUT 603 from the controller to the switch according to an embodiment of the present invention. It can be seen that in BCM, when inductor current 601 reaches zero, the OUT signal is raised to turn on the switch to cause the inductor current to flow again in the next operating cycle of the SMPS. FIG. 6 also shows that the peak point of the inductor current in the operating cycle follows the envelope 602. The envelope of the peak inductor current 602 can be expressed as follows.

$$I_{L\_envelop}(\theta) = \frac{K_{VS} \cdot (\sqrt{2} \cdot Vin \cdot \sin(\theta) - Vo) \cdot V_{CS\_REF}}{\frac{R_{CS}}{\pi} \cdot \int_{arcsin\left(\frac{Vo}{\sqrt{2} \cdot Vin}\right)}^{\pi - arcsin\left(\frac{Vo}{\sqrt{2} \cdot Vin}\right)} K_{VA} \cdot (\sqrt{2} \cdot Vin \cdot \sin(\theta) - Vo) d\theta}$$

$$\left(arcsin\left(\frac{Vo}{\sqrt{2} \cdot \sin}\right) < \theta < \left(\pi - arcsin\left(\frac{Vo}{\sqrt{2} \cdot Vin}\right)\right)\right)$$

From FIG. 6, it can be seen that in BCM, the instantaneous output current Io can be expressed as follows.

$$I_o = \frac{1}{2} \cdot I_{pk},$$

and it follows that $$I_o = \frac{1}{2} \cdot I_{pk}$$
$$= \frac{1}{2} \cdot \frac{V_{CS(ref)}}{R_{CS}}$$
$$= \frac{V_{VS}}{2 \cdot V_{VA} \cdot R_{CS}},$$

Bringing in the definition of $V_{VS}$ and $V_{VA}$, the average output current Io_mean can be expressed as follows.

$$I_{o\_mean} = \frac{1}{\pi} \cdot \int_{arcsin\left(\frac{V_o}{\sqrt{2} \cdot Vin}\right)}^{\pi - arcsin\left(\frac{V_o}{\sqrt{2} \cdot Vin}\right)} \frac{V_{VS}}{2 \cdot V_{VA} \cdot R_{CS}} d\theta$$

$$= \frac{1}{2} \cdot \frac{K_{VS}}{K_{VA} \cdot R_{CS}}$$

Therefore, $$I_{o\_mean} = \frac{1}{2} \cdot \frac{K_{VS}}{K_{VA} \cdot R_{CS}}.$$

It can be seen that, in embodiments of this invention, the average output current Io_mean is independent of the input line voltage Vin and the output voltage Vo, which represents the output load. Therefore, a constant average current Io_mean can be provided to the LED load. Further, in this example, the average output current can be determined by the resistance of the current sense resistor and the resistance ratios in the voltage dividers associated with the sampled $V_{VS}$ and $V_{VA}$ signals.

Figure 7:
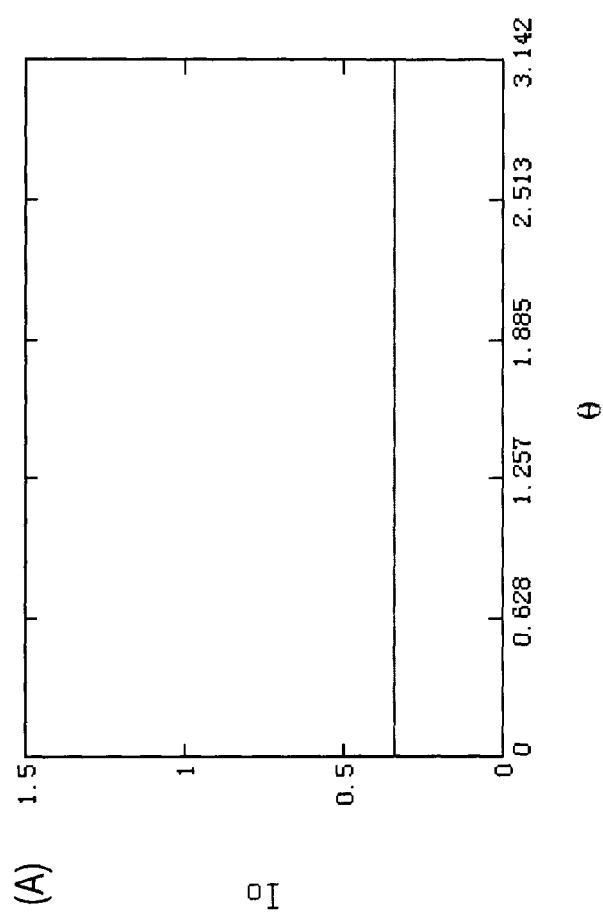
FIG. 7 illustrates the average output current as a function of input voltage phase angle θ within half the period (0, π) under different input voltages and output load conditions.

FIG. 7 illustrates average output current Io as a function of input voltage phase angle θ within half the period (0, π) under different input voltage and output load conditions. It can be seen that the average output current Io remains constant as function of input voltage phase angle θ within half the period (0, π) under different input voltages and output load conditions described above in connection with FIG. 5, including an input voltage of 100V and an output load of 70V, an input voltage of 265V and an output load of 70V, an input voltage of 100V and an output load of 20V, and an input voltage of 265V and an output load of 20V. Thus, the constant average output current can be maintained in an input voltage range of at least from 100V to 265V, and an output load range of at least from 20V to 70V.

According to embodiments of the invention, SMPS 100 can be configured to operate in BCM with high power factors under different input voltages and output load conditions. The power factor can be demonstrated by the relationship between the input current and the input voltage of the power supply. For example, the input current Iin can be expressed as follows.

$$I_{in} = \frac{1}{2} \cdot I_{pk} \cdot \frac{V_o}{\sqrt{2} \cdot V_{in} \cdot \sin\theta}$$

$$I_{in} = \frac{1}{2} \cdot$$

$$\frac{K_{VS} \cdot (\sqrt{2} \cdot V_{in} \cdot \sin\theta - V_O)}{R_{CS} \cdot \frac{1}{\pi} \cdot \int_{arcsin\left(\frac{V_o}{\sqrt{2} \cdot V_{in}}\right)}^{\pi - arcsin\left(\frac{V_o}{\sqrt{2} \cdot V_{in}}\right)} K_{VA} \cdot (\sqrt{2} \cdot V_{in} \cdot \sin\theta - V_O) d\theta} \cdot \frac{V_O}{\sqrt{2} \cdot V_{in} \cdot \sin\theta}$$

Figure 8:
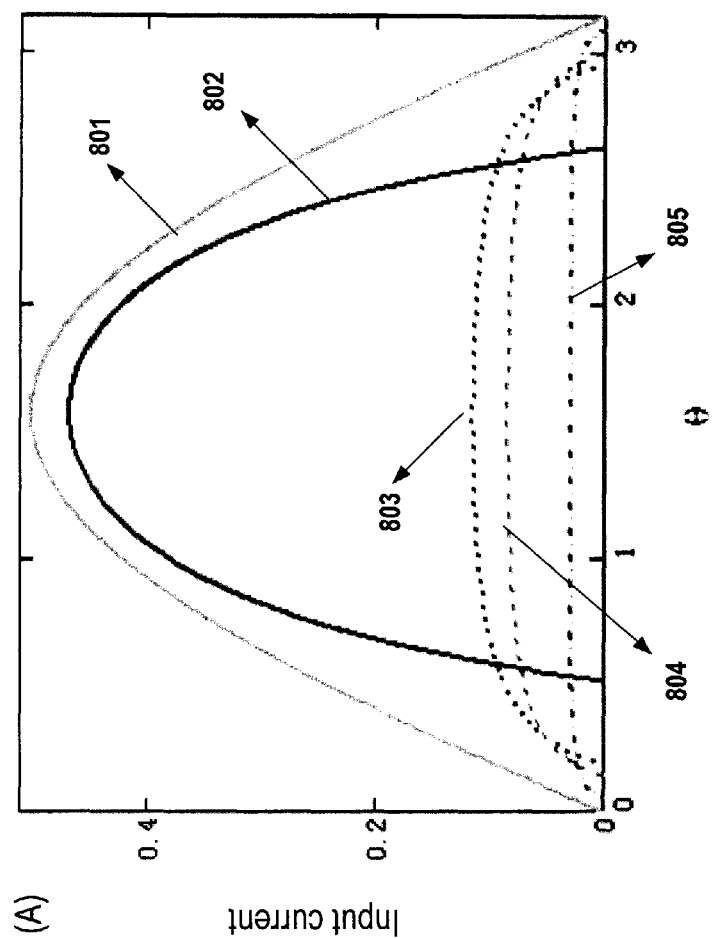
FIG. 8 illustrates the relationship between the input current and the input voltage as a function of input voltage phase angle θ within half the period (0, π) under different input voltages and output load conditions according to an embodiment of the invention.

As shown above, the input voltage Vin can be expressed as √2·Vin·sin θ. FIG. 8 illustrates the relationship between the input current and input voltage as a function of input voltage phase angle θ within half the period (0,π) under different input voltages and output load conditions. In FIG. 8, waveform 801 is a sinusoidal voltage wave form which is in phase with the input line voltage Vin. Waveforms 802-804 represent waveforms of input current under different input voltages and output load conditions, respectively. Waveform 802 is for an input voltage of 100V and an output load of 70V, waveform 803 is for an input voltage of 265V and an output load of 70V, waveform 804 is for an input voltage of 100V and an output load of 20V, and waveform 805 is for an input voltage of 265V and an output load of 20V. It can be seen that the input currents are in phase with the input voltages. Therefore, high power factors can be achieved under different input voltages and output load conditions.

Figure 9:
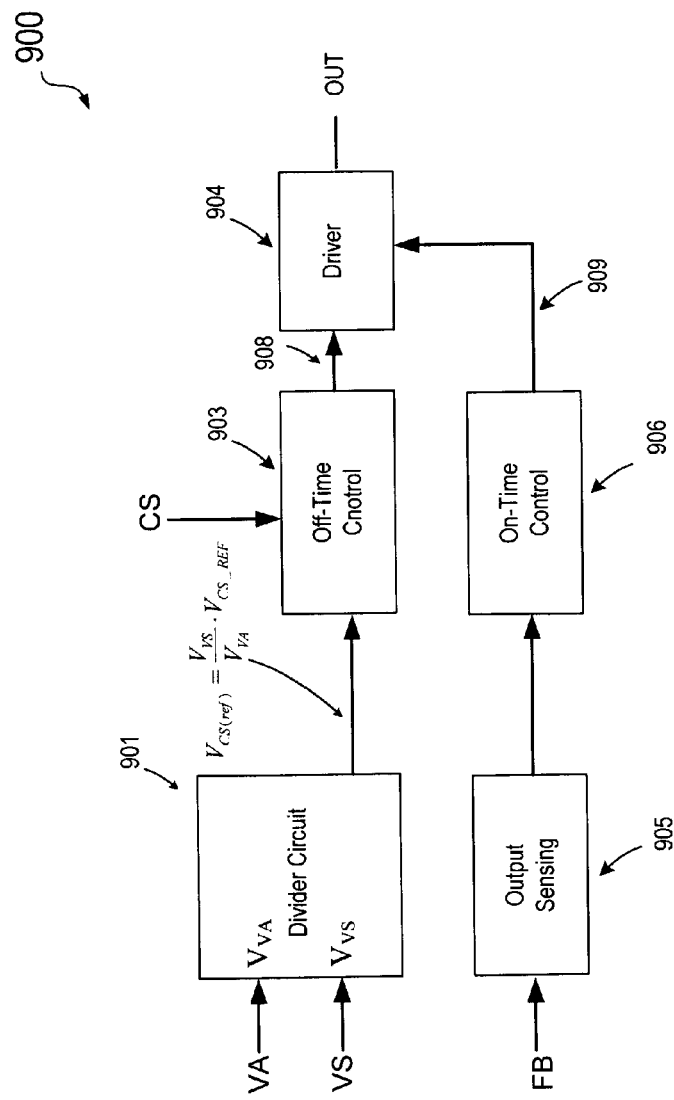
FIG. 9 is a simplified block diagram illustrating part of a power supply controller 900 according to an embodiment of the present invention.

FIG. 9 is a simplified block diagram illustrating part of a power supply controller 900 according to an embodiment of the present invention. In some embodiments, controller 900 can be used as controller 150 in power supply 100 in FIG. 1. In some embodiments, controller 900 is a single-chip controller having eight terminals:

Average negative output voltage sense terminal (VA);
Instantaneous negative output voltage sense terminal (VS);
Feedback terminal (FB);
Inductor current sense terminal (CS); and
Controller output terminal for driving a power switch (OUT).
Power terminal (VCC)—not shown in FIG. 9;
Ground terminal (GND)—not shown in FIG. 9;

As shown in FIG. 9, controller 900 includes divider circuit module 901 coupled to the VS terminal for detecting the instantaneous negative output voltage $V_{VS}$ and the VA terminal for detecting the average negative output voltage $V_{VA}$ as shown in FIG. 1. Divider circuit module 901 is configured to output a peak inductor current sense reference signal $$V_{CS(ref)} = \frac{V_{VS}}{V_{VA}} \cdot V_{CS\_REF}.$$

In FIG. 9, an off-time control module 903 is coupled to divider circuit module 901 to receive the reference voltage, and it is also coupled to the CS pin to receive a current sense signal. Off-time control module 903 provides a first signal 908 to a driver module 904. Moreover, an output sensing module 905 is coupled to the FB pin to receive a feedback signal FB, which is related to the output condition. Sensing module 905 is coupled to an on-time control module 906, which provides a second signal 909 to driver module 904. As shown in FIG. 9, driver module 904 is coupled to the OUT pin to provide a control signal OUT for controlling the switch device.

According to embodiments of the invention, when the conditions described above are met, the power supply is configured to maintain a constant output current despite variations in the input AC voltage or output load. However, in some case, because the controller is configured to monitor the peak inductor current to regulate the constant LED current, certain time delays may exist that may prevent the output current to be completely independent of the variations in the input voltage or output load. For example, when the output load changes from a full load to a half load, the output current may increase. When the input line voltage increases, the output current may also increase. To counter these conditions, in some embodiments of the invention, a compensation method is provided as described below.

Figure 10:
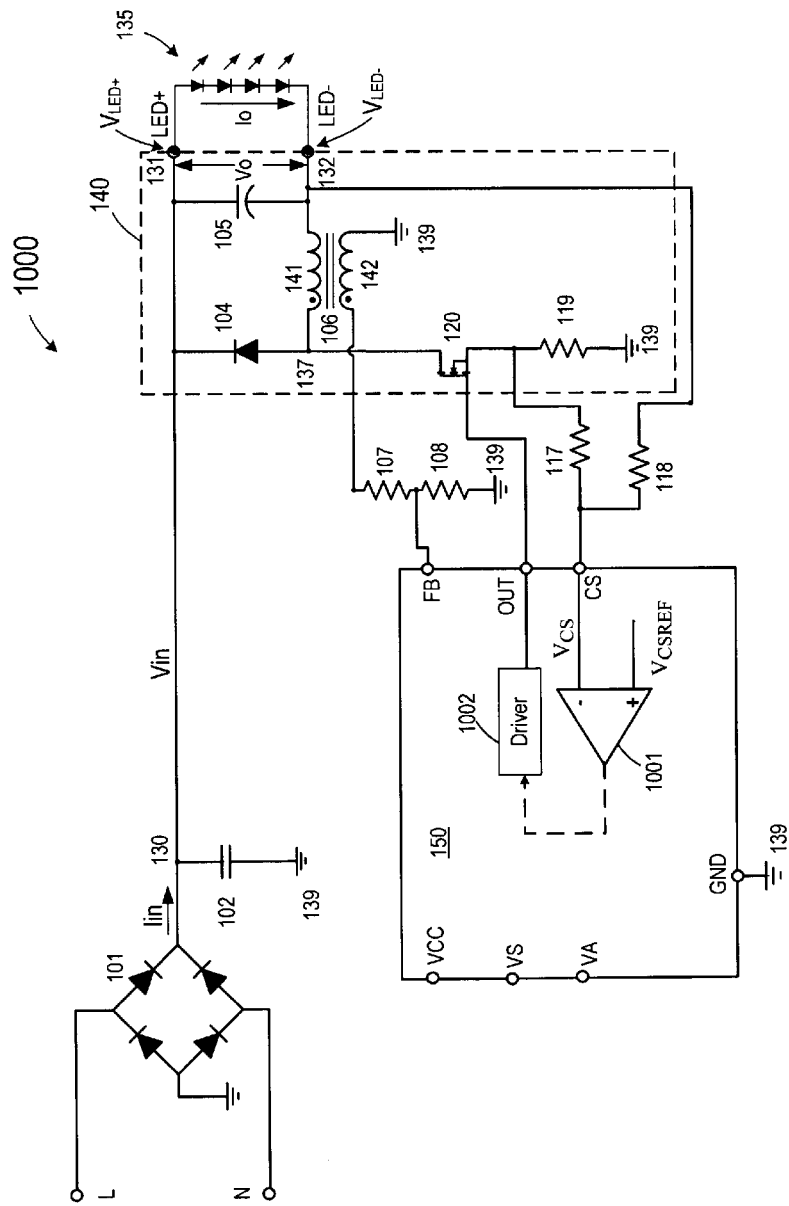
FIG. 10 is a simplified diagram illustrating part of a switch mode power supply (SMPS) 1000 driving a string of light emitting diodes (LED) according to an embodiment of the present invention.

FIG. 10 is a simplified diagram illustrating part of a switch mode power supply (SMPS) 1000 driving a string of light emitting diodes (LED) 135 according to an embodiment of the present invention. SMPS 1000 is similar to SMPS 100 of FIG. 1, and descriptions of similar components and functions are not repeated here. As described above in connection to FIG. 1, controller 150 has several terminals, including an input terminal CS for receiving a current sense signal $V_{CS}$ associated with a current flowing through inductor 141 and switch device 120. The CS terminal is coupled to switch device 120 and a current sense resistor 119 through a resistor 117. Controller 150 is configured to determine an inductor peak current $I_{pk}$ when current sense signal $V_{CS}$ reaches a reference value, at which point controller 150 issues a control signal to turn off switch device 120. As shown in FIG. 10, controller 150 has a comparison circuit 1001 that compares $V_{CS}$ with a reference value $V_{CSREF}$. The output of comparison circuit 1001 is fed to a driver circuit 1002, which provides a control signal at the OUT terminal to switch device 120. In some embodiments of the invention, controller 150 is configured to receive a compensation signal at the CS terminal from the negative output terminal 132 of the SMPS through a resistor 118. As a result, the signal at terminal CS, $V_{CS}$, includes a compensation signal which is a portion of the voltage at the negative output terminal 132 (LED−). As described above, $V_{LED-}$ can be expressed as follows.

$$\sqrt{2} \cdot Vin \cdot \sin \theta - Vo.$$

It can be seen that an increase in input line voltage Vin is sensed as a larger $V_{CS}$, leading to earlier turn off of switch device 120 and preventing an increase in output current. Similarly, a drop in output load Io is sensed as a larger $V_{CS}$, leading to earlier turn off of switch device 120 and preventing an increase in output current. Therefore, the compensation method described above uses a single sensed compensation signal to prevent or reduce changes in output current as a result of the variation in the input line voltage or the output load.

The above description includes specific examples used to illustrate various embodiments of this invention. It is understood, however, that the examples and embodiments described herein are for illustrative purposes only. Various modifications or changes in light thereof will be suggested to persons skilled in the art and are to be included within the spirit and purview of this invention.

What is claimed is:

1. A switch mode power supply (SMPS), comprising:
an input terminal and a ground terminal for receiving a rectified DC input voltage;
a positive output terminal and a negative output terminal for providing an output current to an output load, the output current being configured to flow from the positive output terminal through the output load to the negative output terminal, the positive output terminal being coupled to the input terminal;
a buck converter circuit, including:
a first inductor having one end coupled to the negative output terminal;
a switch device coupled to the other end of the first inductor at a first node, the switch device being coupled to a current sense resistor which is coupled to the ground terminal;
a diode coupled between the input terminal and the first node, and
an output capacitor coupled between the positive output terminal and the negative output terminal;
and
a controller configured for regulating the output current based at least in part on controlling a peak current in the first inductor according to a ratio between an instantaneous voltage at the negative output terminal to an average voltage at the negative output terminal, the controller also configured to receive an output compensation signal from the negative output terminal of the SMPS;

wherein the controller is configured to cause the SMPS to operate in a boundary conduction mode (BCM).

2. The switch mode power supply of claim 1, wherein in the boundary conduction mode (BCM), when the current in the first inductor is discharged to zero, the switch device is turned on to allow current to flow in the first inductor.

3. The switch mode power supply of claim 1, wherein the controller is configured to maintain a constant average output current that is independent of the input voltage and the output load voltage.

4. The switch mode power supply of claim 1, wherein the input current is a time-varying signal that is in phase with the input voltage, thereby providing a high power factor.

5. The switch mode power supply of claim 1, wherein the controller is configured to use a single sensed compensation signal to compensate for variations in the input voltage and output load voltage.

6. The switch mode power supply of claim 1, wherein the controller comprises:
a first input terminal for receiving the instantaneous voltage signal $V_{VS}$ from the negative output terminal of the SMPS;
a second input terminal for receiving the average voltage signal $V_{VA}$ from the negative output terminal of the SMPS;
a third input terminal for receiving a current sense signal associated with a current flowing through the first inductor and the switch device, wherein the third input terminal is also coupled to the negative output terminal of the SMPS through a compensation resistor for receiving the compensation signal;
an output terminal for providing a control signal to turn on and off the switch device to regulate the output current of the SMPS;
wherein when the switch device is turned on, an electric current builds up in the first inductor, and when the switch device is turned off, the current in the first inductor discharges to the output capacitor;
wherein the controller is configured to provide the control signal based at least in part on comparing the current sense signal $V_{CS}$ and a reference signal defined by $$V_{CS(ref)} = \frac{V_{VS}}{V_{VA}}.$$

7. The switch mode power supply of claim 6, wherein the first input terminal of the controller is coupled to the negative output terminal of the SMPS through a first voltage divider which includes a first resistor in series with a parallel combination of a second resistor and a first capacitor, the first capacitor being configured for providing the instantaneous voltage signal $V_{VS}$.

8. The switch mode power supply of claim 7, wherein the second input terminal of the controller is coupled to the negative output terminal of the SMPS through a second voltage divider which includes a third resistor in series with a parallel combination of a fourth resistor and a second capacitor, the second capacitor being configured for providing the average voltage signal $V_{VA}$.

9. The switch mode power supply of claim 8, wherein the first capacitor has a capacitance in the range from 1.0 pF to 10 nF, wherein the second capacitor has a capacitance in the range from 100 nF to 10 µF.

10. The switch mode power supply of claim 8, wherein the average output current is defined by $$I_{o\_mean} = \frac{1}{2} \cdot \frac{K_{VS}}{K_{VA} \cdot R_{CS}},$$

where $K_{VS}$ is the resistance ratio in the first voltage divider, $K_{VA}$ is the resistance ratio in the second voltage divider, and $R_{CS}$ is the resistance of the current sense resistor.

11. The switch mode power supply of claim 6, wherein the third input terminal of the controller is coupled to the current sense resistor for receiving the current sense signal, wherein the third input terminal of the controller is coupled to the negative output terminal of the SMPS through a compensation resistor for receiving an output compensation signal.

12. The switch mode power supply of claim 1, wherein the buck converter circuit comprises a transformer, and the first inductor is a primary winding of the transformer, the transformer further including a secondary winding which provides a feedback signal to a feedback input terminal of the controller for monitoring discharging of the first inductor and turning on the switch device.

13. A switch mode power supply (SMPS), comprising:
an input terminal and a ground terminal for receiving a rectified DC input voltage;
a positive output terminal and a negative output terminal for providing an output current to an output load, the output current being configured to flow from the positive output terminal through the output load to the negative output terminal, the positive output terminal being connected to the input terminal;
a buck converter circuit, including:
a first inductor having one end coupled to the negative output terminal;
a switch device coupled to the other end of the first inductor at a first node, the switch device being coupled to a current sense resistor which is coupled to the ground terminal;
a diode coupled between the input terminal and the first node, and
an output capacitor coupled between the positive output terminal and the negative output terminal; and
a controller configured for regulating the output current based at least in part on controlling a peak current in the first inductor according to a ratio between an instantaneous voltage at the negative output terminal to an average voltage at the negative output terminal;
wherein the controller is configured to cause the SMPS to operate in a boundary conduction mode (BCM).

14. The switch mode power supply of claim 13, wherein in the boundary conduction mode (BCM), when the current in the first inductor is discharged to zero, the switch device is turned on to allow current to flow in the first inductor.

15. The switch mode power supply of claim 13, wherein the controller is configured to maintain a constant average output current that is independent of the input voltage and the output voltage.

16. The switch mode power supply of claim 13, wherein the controller is configured such that the input current of the SMPS is a time-varying signal that is in phase with the input voltage, thereby providing a high power factor.

17. The switch mode power supply of claim 13, wherein the buck converter circuit comprises a transformer, and the first inductor is a primary winding of the transformer, the transformer further including a secondary winding winding which provides a feedback signal to a feedback input terminal of the controller for monitoring discharging of the first inductor and turning on the switch device.

18. A switch mode power supply (SMPS), comprising:
   an input terminal and a ground terminal for receiving a rectified DC input voltage;
   a positive output terminal and a negative output terminal for providing an output current to an output load, the output current being configured to flow from the positive output terminal through the output load to the negative output terminal, the positive output terminal being connected to the input terminal;
   a buck converter circuit, including:
      a first inductor having one end coupled to the negative output terminal;
      a switch device coupled to the other end of the first inductor at a first node, the switch device being coupled to a current sense resistor which is coupled to the ground terminal;
      a diode coupled between the input terminal and the first node, and
      an output capacitor coupled between the positive output terminal and the negative output terminal;
   and
   a controller configured for regulating the output current based at least in part on controlling a peak current in the first inductor, the controller also configured to receive an output compensation signal from the negative output terminal of the SMPS.

19. The switch mode power supply of claim 18, wherein the controller is configured to use a single sensed compensation signal to compensate for variations in the input voltage and output load voltage.

20. The switch mode power supply of claim 18, wherein the buck converter circuit comprises a transformer, and the first inductor is a primary winding of the transformer, the transformer further including a secondary winding which provides a feedback signal to a feedback input terminal of the controller for monitoring discharging of the first inductor and turning on the switch device.

21. A switch mode power supply (SMPS), comprising:
   an input terminal and a ground terminal for receiving a rectified DC input voltage;
   a positive output terminal and a negative output terminal for providing an output current to an output load, the output current being configured to flow from the positive output terminal through the output load to the negative output terminal, the positive output terminal being connected to the input terminal;
   a buck converter circuit, including:
      a first inductor having one end coupled to the negative output terminal;
      a switch device coupled to the other end of the first inductor at a first node, the switch device being coupled to a current sense resistor which is coupled to the ground terminal;
      a diode coupled between the input terminal and the first node, and
      an output capacitor coupled between the positive output terminal and the negative output terminal;
   and
   a controller configured for regulating the output current based at least in part on controlling a peak current in the first inductor and a ratio between an instantaneous voltage at the negative output terminal to an average voltage at the negative output terminal.

22. The switch mode power supply of claim 21, wherein the buck converter circuit comprises a transformer, and the first inductor is a primary winding of the transformer, the transformer further including a secondary winding which provides a feedback signal to a feedback input terminal of the controller for monitoring discharging of the first inductor and turning on the switch device.

* * * * *